(12) United States Patent

Schorr

(10) Patent No.: US 12,590,673 B2
(45) Date of Patent: Mar. 31, 2026

(54) UTILITY CLAMPING DEVICE

(71) Applicant: Gary J. Schorr, Mesa, AZ (US)

(72) Inventor: Gary J. Schorr, Mesa, AZ (US)

( * ) Notice: Subject to any disclaimer, the term of this patent is extended or adjusted under 35 U.S.C. 154(b) by 0 days.

(21) Appl. No.: 18/811,939

(22) Filed: Aug. 22, 2024

(65) Prior Publication Data

US 2025/0067391 A1     Feb. 27, 2025

Related U.S. Application Data

(60) Provisional application No. 63/534,059, filed on Aug. 22, 2023.

(51) Int. Cl.
| | |
|---|---|
| *F16B 2/18* | (2006.01) |
| *A45B 1/00* | (2006.01) |
| *A47G 29/08* | (2006.01) |
| *F16M 13/02* | (2006.01) |

(52) U.S. Cl.
CPC ............. *F16M 13/022* (2013.01); *A45B 1/00* (2013.01); *A47G 29/08* (2013.01); *F16B 2/18* (2013.01); *A45B 2200/1009* (2013.01)

(58) Field of Classification Search
CPC .. A45B 1/00; A45B 2200/1009; A47G 29/08; F16B 2/18; F16B 5/01; F16B 37/044
See application file for complete search history.

(56) References Cited

U.S. PATENT DOCUMENTS

| | | | | |
|---|---|---|---|---|
| 4,639,979 A | * | 2/1987 | Polson | F16B 7/1418 |
| | | | | 285/373 |
| 4,860,909 A | * | 8/1989 | Leumi | B65F 1/12 |
| | | | | 220/908 |
| 6,523,230 B1 | * | 2/2003 | Weinhold | F16L 33/26 |
| | | | | 24/270 |
| 7,261,263 B2 | * | 8/2007 | Baker | A47F 5/04 |
| | | | | 248/316.1 |
| 7,338,247 B2 | * | 3/2008 | Ateca | F16B 2/18 |
| | | | | 411/324 |
| 8,342,468 B1 | * | 1/2013 | Strickland | A47G 23/0225 |
| | | | | 248/316.1 |
| 9,059,578 B2 | * | 6/2015 | Sokolowski | H02G 3/30 |
| 9,132,844 B2 | * | 9/2015 | Wood | B61L 5/18 |
| 9,516,958 B1 | * | 12/2016 | McAllister | A47F 10/06 |
| 9,682,759 B1 | * | 6/2017 | Huntley | F16B 2/005 |
| 10,247,352 B2 | * | 4/2019 | Oginski | F16M 11/2007 |
| 10,765,185 B1 | * | 9/2020 | Wengerd | F16B 2/185 |

(Continued)

*Primary Examiner* — Nkeisha Smith
(74) *Attorney, Agent, or Firm* — Accelerate IP LLC

(57) ABSTRACT

The utility clamping device can hold at least one accessory on a shaft. The device comprises a first and second collar, both detachably and rotatably coupled together, each having an inner and outer surface, as well as a top and bottom surface. The device also includes a first and second shim, each having an inner and outer surface, with the outer shim surface removably coupled to the inner collar surface. The inner shim surface is designed to be compression fit about the shaft. The device features a slot on the top surface, extending longitudinally along a central axis of the collars, which accommodates the insertion of the accessory. An outer groove on the outer collar surface allows the accessory to securely attach itself. The device can hold various accessories such as a phone and tablet holder, drink holder, Bluetooth speaker holder, beverage bag holder, mini-cooler, tray, towel holder, and more.

16 Claims, 10 Drawing Sheets

(56) References Cited

U.S. PATENT DOCUMENTS

| | | | | |
|---|---|---|---|---|
| 10,876,676 | B2 * | 12/2020 | Cook | F16M 11/041 |
| 11,344,088 | B1 * | 5/2022 | Bowens | A45B 1/04 |
| 11,543,075 | B1 * | 1/2023 | Parekh | F16M 13/022 |
| 11,555,577 | B2 * | 1/2023 | Park | F16B 2/185 |
| 11,643,160 | B2 * | 5/2023 | Downing | B62J 11/00 |
| | | | | 280/288.4 |
| 11,940,093 | B2 * | 3/2024 | Evitt | F16B 7/0473 |
| 11,998,791 | B2 * | 6/2024 | Zhang | A63B 21/0724 |
| 2005/0105963 | A1 * | 5/2005 | Maniezzo | F16B 2/185 |
| | | | | 403/289 |
| 2009/0249590 | A1 * | 10/2009 | Maroso | F16B 2/10 |
| | | | | 24/489 |
| 2015/0286115 | A1 * | 10/2015 | Koch | F16M 11/2078 |
| | | | | 248/230.4 |
| 2020/0030058 | A1 * | 1/2020 | Bellows | F16M 11/2014 |
| 2023/0250841 | A1 * | 8/2023 | Jodeleit | F16B 11/006 |
| | | | | 156/66 |

* cited by examiner

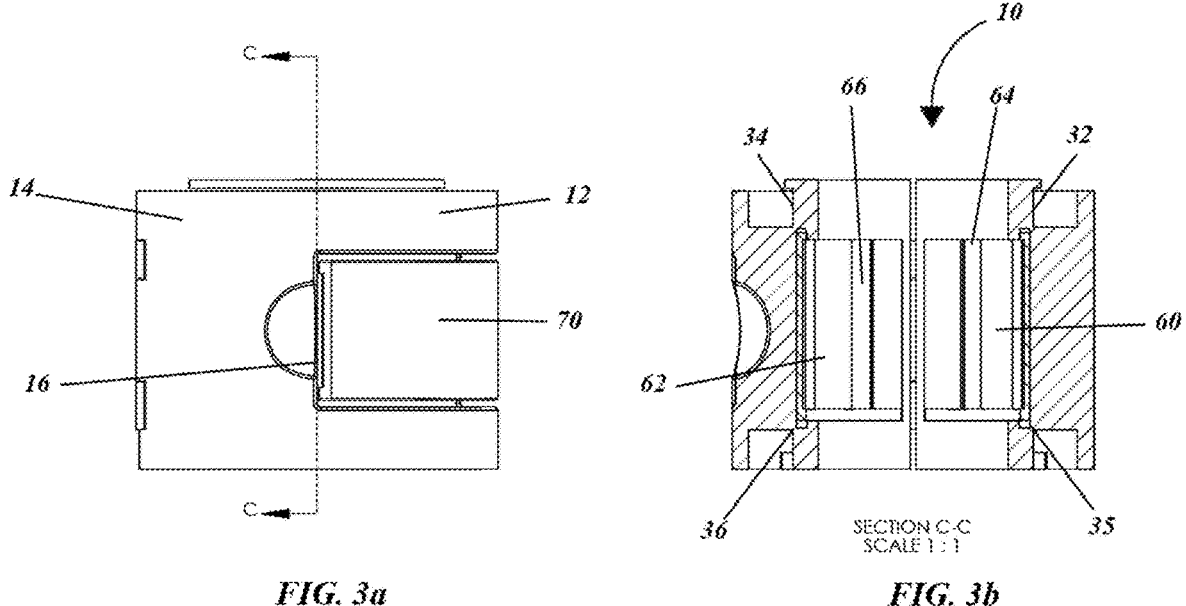
FIG. 3a
FIG. 3b
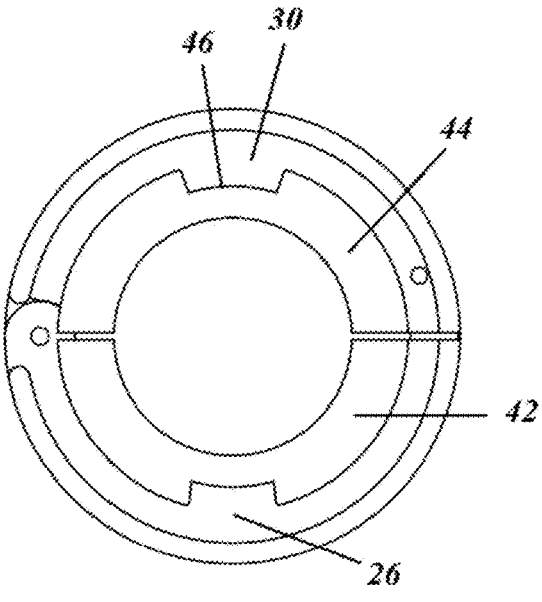
FIG. 4

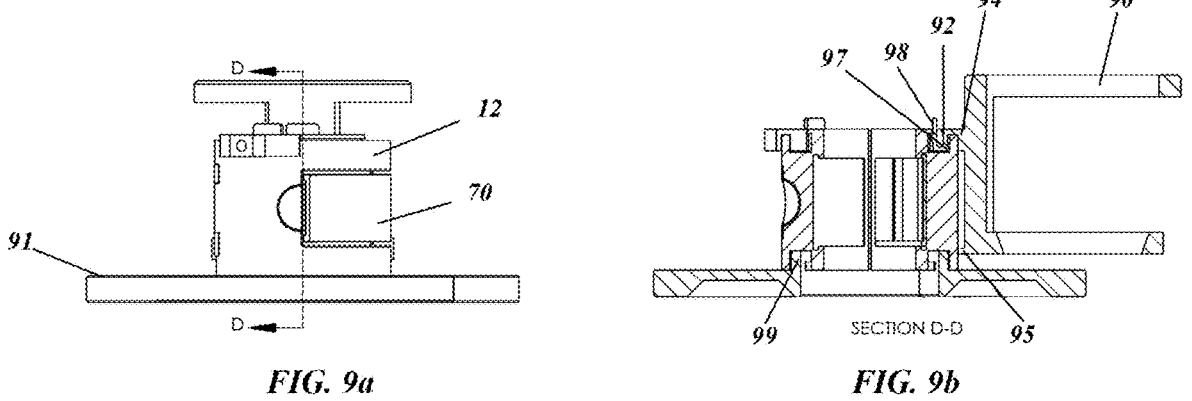
*FIG. 9a*                 *FIG. 9b*
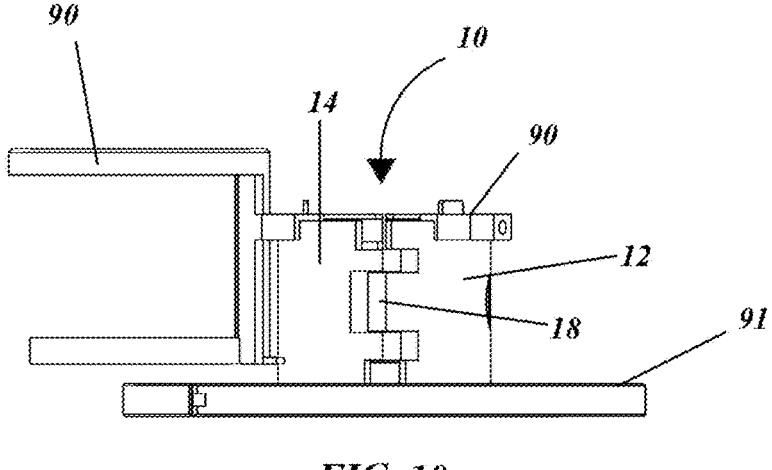
*FIG. 10*

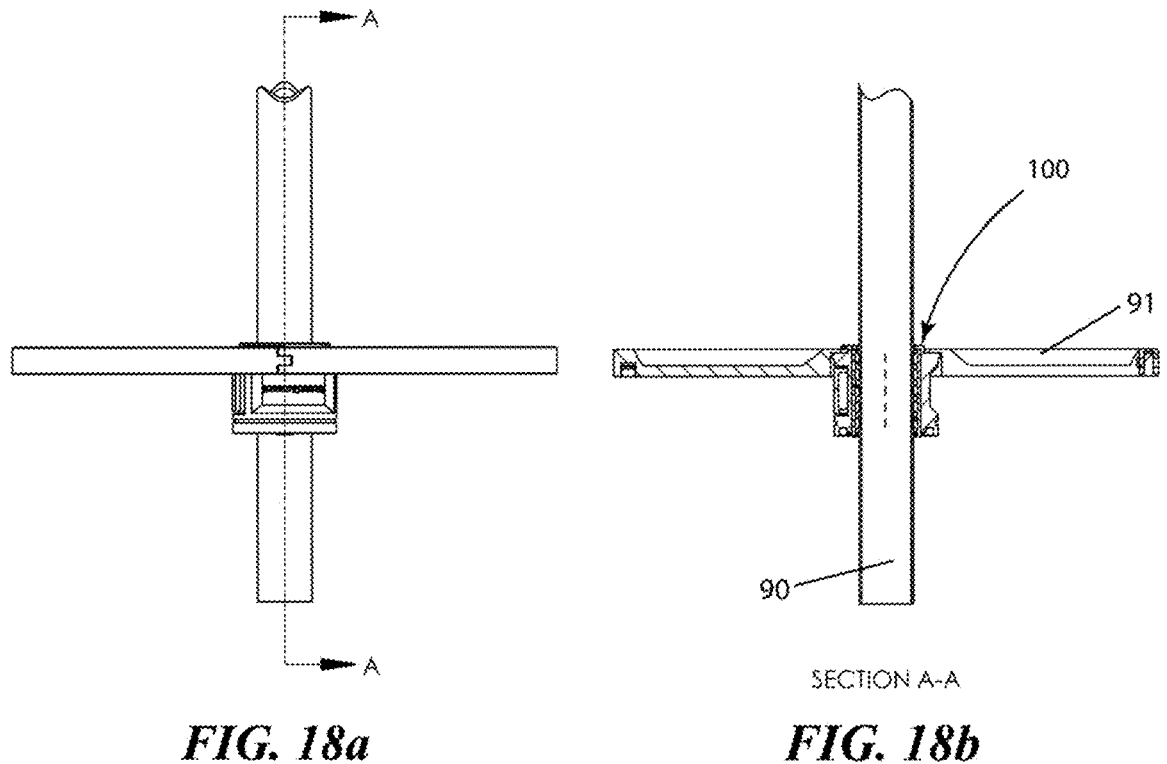
*FIG. 18a*            *FIG. 18b*

UTILITY CLAMPING DEVICE

CROSS REFERENCE

This application claims benefit from currently pending U.S. Provisional Application No. 63/534,059 titled "Utility Clamping Device" and having a filing date of Aug. 22, 2024, all of which is incorporated by reference herein.

FIELD OF THE INVENTION

The present specification relates generally to system for holding items and more specifically a system for securely holding items on a shaft such as an umbrella pole.

BACKGROUND OF THE INVENTION

Outdoor pool areas provide a space for relaxation, recreation, and socializing. Traditional umbrellas are commonly used to provide shade and protection from the sun's rays, enhancing the overall poolside experience. Umbrellas are widely used for protection against adverse weather conditions, primarily rain and sun specially around a pool or at a lake. However, the conventional umbrella design lacks provisions for conveniently holding and accessing personal items such as bags, mobile devices, keys, and other belongings, leading to challenges for users who require both hands to be free or who seek a more organized and efficient means of carrying their possessions during inclement weather.

Various prior art solutions have attempted to address the need for additional functionalities within umbrella designs, but these solutions often suffer from limitations in terms of practicality, ease of use, or compatibility with different types of umbrellas. Early attempts at incorporating item-holding features involved the introduction of clip-on pouches or bags that could be attached to the umbrella shaft. While providing basic storage options, these solutions often lacked stability, were prone to shifting, and could negatively impact the balance of the umbrella. Other inventions often feature built-in stands that provided storage space for small items like beverages, phones, or accessories. Attachable cup holders for umbrellas provided a simple solution for holding beverages, but they lacked versatility for holding other types of items. Other solutions offer complex mechanical mechanisms that can be prone to malfunction or pose safety risks.

While prior art has made commendable efforts to integrate item-holding features into umbrella designs, there remain several challenges and limitations such as, restricted storage capacity, often only accommodating small lightweight items. Some solutions, such as clip-on pouches, were prone to instability and could alter the umbrella's balance. Many designs were tailored to specific scenarios, such as patio settings, rather than offering versatility for general umbrella use.

The invention presented in this patent application takes a fresh approach to addressing the limitations of prior art by introducing a comprehensive and adaptable solution for holding various items within or alongside an umbrella. By leveraging advanced materials, innovative attachment mechanisms, and user-centric design principles, the present invention seeks to redefine the umbrella experience, offering enhanced convenience, storage capacity, stability, and protection for personal belongings and accessories.

BRIEF SUMMARY OF THE INVENTION

Accordingly, the present invention pertains to a utility clamping device, specifically designed to securely hold at least one component on a shaft. The clamping device can have a first collar and a second collar, both detachably and rotatably coupled together, and equipped with an inner and outer collar surface, as well as a top and bottom surface. The utility clamping device can further include a first and second shim, each having an inner and outer shim surface. The outer shim surface can be removably coupled to the inner collar surface, while the inner shim surface can be designed to be compression fit about the shaft.

The utility clamping device can have a slot on the top surface, extending longitudinally along a central axis of the first and second collar, which accommodates the insertion of at least one accessory. An outer groove on the outer collar surface allows the accessory to securely attach itself to the groove. The first and second shims, as well as the first and second collars, can be configured in a C-shape. The outer shim surface can include at least one shim channel, and the inner shim surface can have at least one shim cushion, allowing for the shim cushion to compress against the shaft.

The first and second collars can be rotatably coupled together by a pin and a joint, and removably coupled by a clasp. The collars can also have at least one inner groove where the first and second shims are removably coupled. The clamping device can accommodate various accessories, including but not limited to a phone and tablet holder, drink holder, Bluetooth speaker holder, beverage bag holder, minicooler, tray, and towel holder. These accessories can be removably locked into the outer groove or first top groove and/or first bottom groove by a locking tab on the accessory. The first and second collars, as well as the first and second shims, can be made from a variety of materials, including but not limited to plastic, stainless steel, aluminum, rubber, nitrile, neoprene, Teflon, Viton, or thermoplastic polyurethane. This utility clamping device offers a versatile and secure solution for holding various accessories on a shaft, providing convenience and functionality in a wide range of applications.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for" and will also recite the word "function" (i.e., will state "means for performing the function of . . . , without also reciting in such phrases any structure, material or act in support of the function. Thus, even when the claims recite a "means for performing the function of molding a . . . , step for performing the function of molding a . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

FIG. 3*a* is a front view of the utility clamping device in accordance to one, or more embodiments;

FIG. 3*b* is a cross-sectional view of FIG. 3*a* of the utility clamping device for holding at least one accessory in accordance to one, or more embodiments;

FIG. 4 is a bottom view of the utility clamping device in accordance to one, or more embodiments;

FIG. 9*a* is a side view of the utility clamping device holding at least one accessory in accordance to one, or more embodiments;

FIG. 9*b* is a sectional view of FIG. 9*a* of the utility clamping device holding at least one accessory in accordance to one, or more embodiments; and FIG. 10 is a side view of the utility clamping device holding at least one accessory in accordance to one, or more embodiments;

FIG. 18*a* is a side view of another embodiment of the utility clamping device holding at least one accessory in accordance to one, or more embodiments; and FIG. 18*b* is a cross-sectional view of FIG. 18*a* of another embodiment of the utility clamping device holding at least one accessory in accordance to one, or more embodiments.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 11:
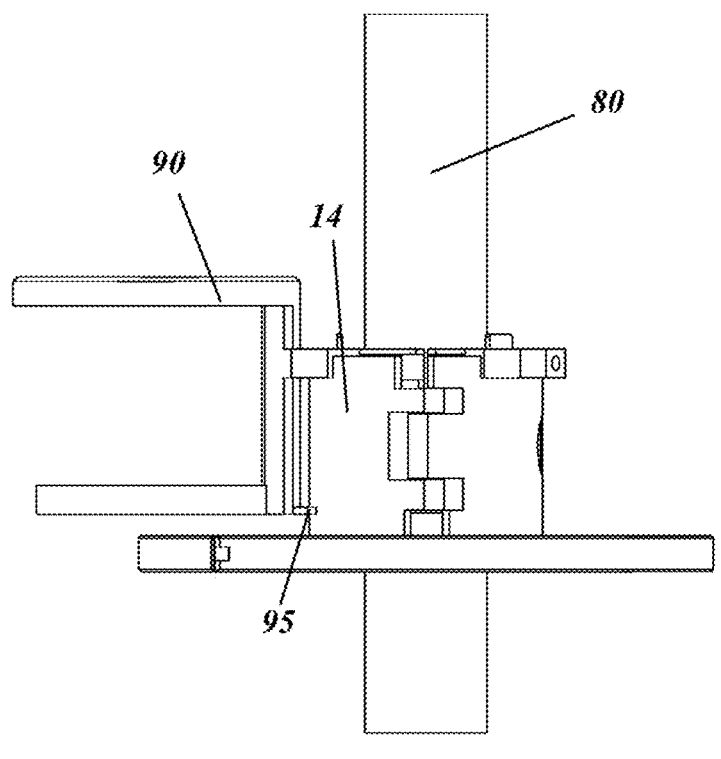
FIG. 11 is a bottom view of the utility clamping device for holding at least one accessory shown clamped onto an umbrella pole in accordance to one, or more embodiments.

Referring to FIGS. 1-18*b*, a utility clamping device for holding at least one accessory on a shaft 80 is shown generally at 10 and 100 wherein the shaft can be such as, for example, umbrella pole, golf cart roll cage, roll cage, basketball hoop pole, awning pole, bicycle tubing, or the like. The utility clamping device 10 can comprise a first collar 12 and a second collar 14 detachably coupled together on a first side 16 and rotatably coupled together on a second side 18 wherein the first collar and the second collar can have an inner collar surface 15 and an outer collar surface 17. The first collar 12 and the second collar 14 can be in the shape and configuration like such as, for example, C-shape, semi-circle, half circle, triangular, rectangular, polygonal or the like. The first collar 12 and the second collar 14 can have a thickness between the inner collar surface 15 and the outer collar surface 17 with a height. The inner collar surface 15 and outer collar surface 17 can be any suitable shape and size but in the preferred embodiment the inner collar surface can have an inner diameter and outer diameter. The first collar 12 and the second collar 14 can be made from such as, for example, plastic, metal, aluminum, composite, ceramics, or the like. The first collar 12 and the second collar 14 can be rotatably coupled together on the second side 18 by such as, pin joint, hinge, swivel joint, or the like. The first collar 12 and second collar 14 can rotate about the pin and joint's axis wherein the user can open and close the utility clamping device easily around a shaft 80, as shown in FIG. 11.

Figure 1:
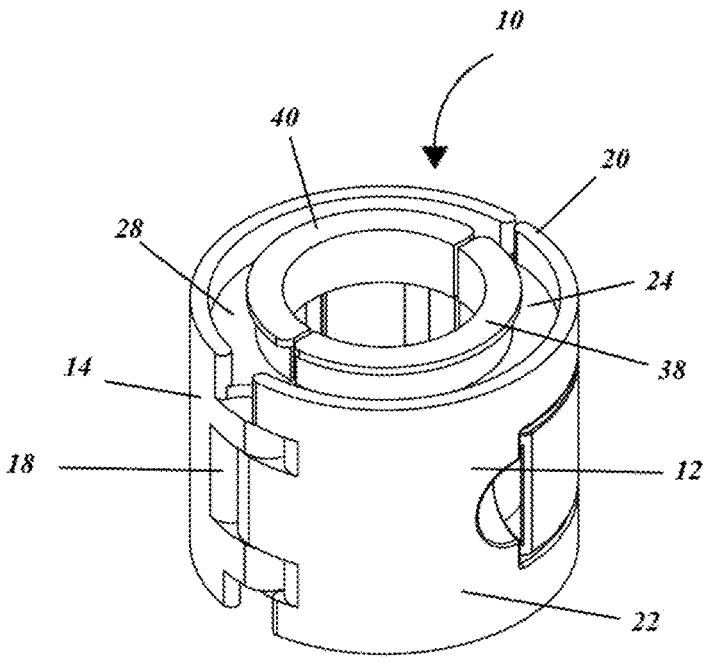
FIG. 1 is a back isometric view of the utility clamping device in accordance to one, or more embodiments.
Figure 2:
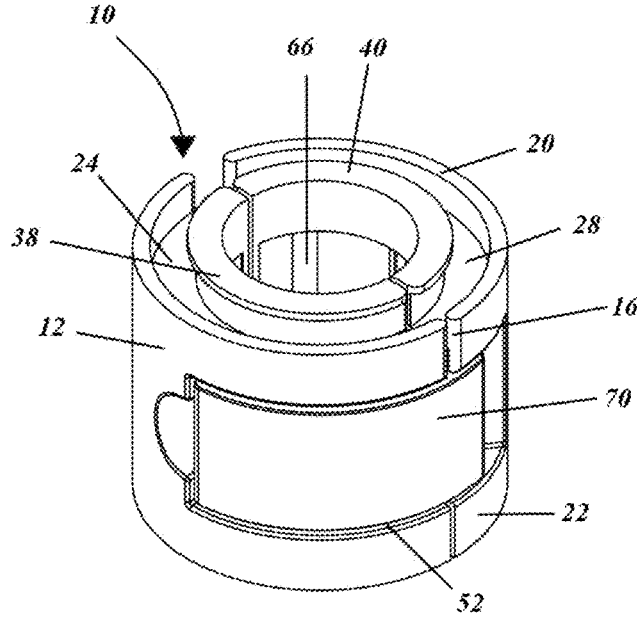
FIG. 2 is a front isometric view of the utility clamping device in accordance to one, or more embodiments.
Figures 5, 6:
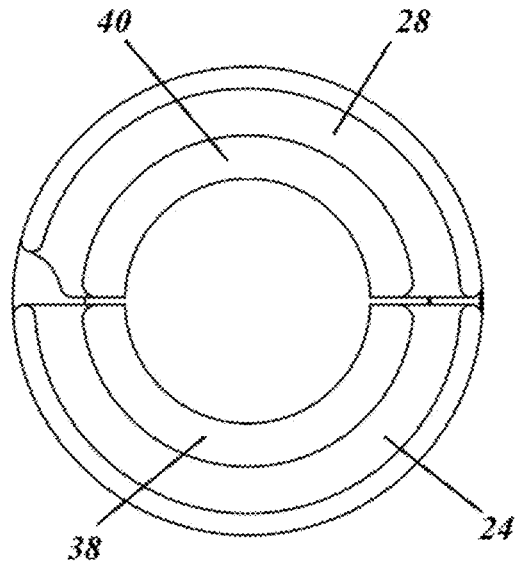
FIG. 5 is a top view of the utility clamping in accordance to one, or more embodiments.
FIG. 6 is a side view of the utility clamping device for holding at least one accessory in accordance to one, or more embodiments.
Figure 8:
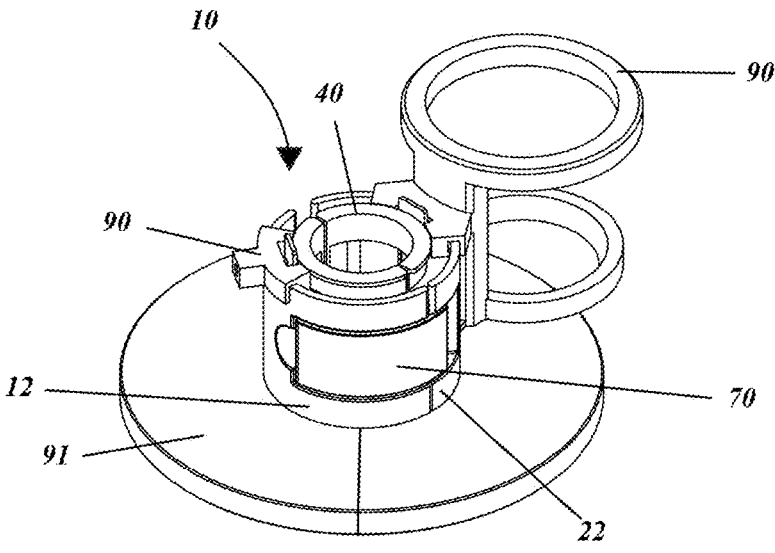
FIG. 8 is an isometric view of the utility clamping device holding at least one accessory in accordance to one, or more embodiments.
Figure 13:
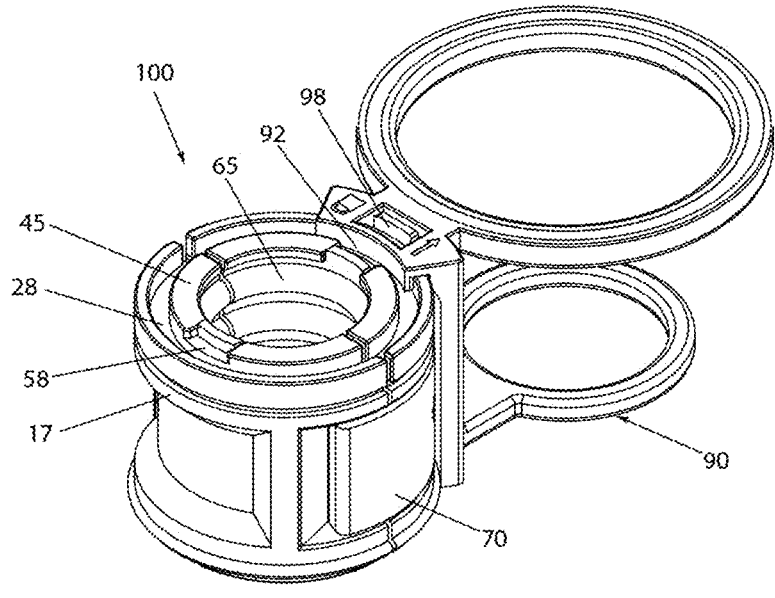
FIG. 13 is an isometric view of another embodiment of the utility clamping device holding at least one accessory in accordance to one, or more embodiments.

The first collar 12 and the second collar 14 can have a top surface 20 and a bottom surface 22 wherein the top surface can have a slot 28 disposed on it extending longitudinally along a central axis of the first collar and the second collar which can accommodate the insertion of the at least one accessory. The slot 28 can be disposed on the top surface 20 as shown in FIG. 13. In other embodiments, the first collar 12 and the second collar 14 can have the slot 28 disposed on the top surface 20 and a bottom slot 30 can be disposed on the bottom surface 22, as shown in FIGS. 1 and 4. The slot 28 and the bottom slot 30 can have a depth extending from the top surface 20 and bottom surface 22 wherein the depth can be 0.01 inches to 3 inch and more particularly 0.1 to 0.125 inches. The first collar 12 and the second collar 14 can further comprise an outer groove 19 disposed on the outer collar surface 17 allowing at least one accessory to securely attach itself to the outer groove. The outer groove 19 can be disposed on the first collar 12 and the second collar 14 cutting into longitudinally along a central axis to the first collar and the second collar substantially near the In certain embodiments, the first collar 12 can have a first top channel 32 and a first bottom channel 35 and the second collar 14 can have a second top channel 34 and a second bottom channel 36 wherein the first top channel and the second top channel can have the same axial depth and the first bottom channel, and second bottom channel can have the same axial depth as shown in FIG. 3b. The first top channel 32 and the second top channel 34 can form a first top ledge 38 and second top ledge 40 that can extend above the top surface 20 and in other embodiment can be the same height or below the top surface. The first top ledge 38 and second top ledge 40 can be from the first top channel 32 and the second top channel 34 between the two top ledges and the first top groove 24. The first top ledge 38 and the second top ledge 40 can allow the user to insert an accessory 90 having a corresponding tongue and ledge locking the accessory into place and allowing the user to easily remove the accessory as shown in FIG. 8. In other embodiments the first top channel 32 and the second top channel 34 can be omitted as shown in FIG. 13 and a top extension 45 and a bottom extension 54 can extend from the slot 28 and can have a shim notch 58 on the top extension that can extend through the top extension in at least one location in both the first collar 12 and the second collar 14.

Figure 15:
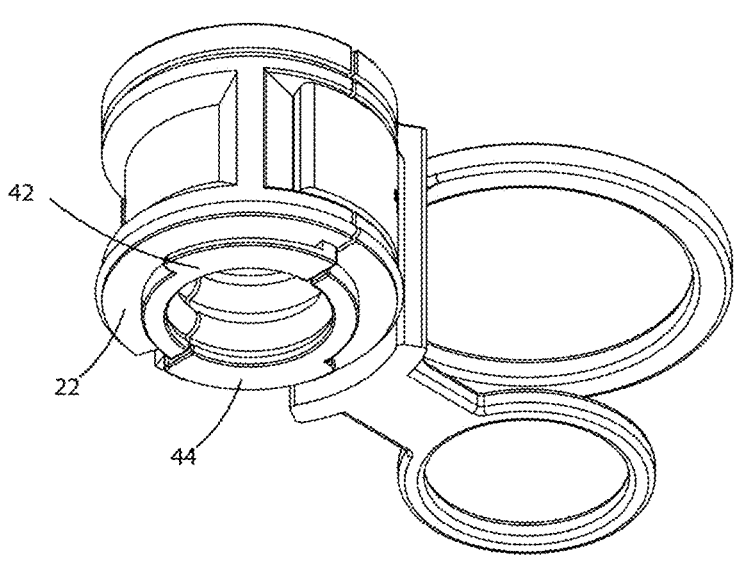
FIG. 15 is a bottom isometric view of another embodiment of the utility clamping device holding at least one accessory in accordance to one, or more embodiments.

The first bottom channel 35 and second bottom channel 36 can extend to a first bottom ledge 42 and a second bottom ledge 44 wherein the first bottom ledge and the second bottom ledge can be the same height as the bottom surface 22 or in other embodiments can extend above the bottom surface or below the bottom surface. The first bottom ledge 42 and the second bottom ledge 44 can have at least one locking slot 46, as shown in FIG. 4, or in other embodiments the first bottom ledge and the second bottom ledge can extend partially around the axis of the first collar 12 and the second collar, as shown in FIG. 15. The first bottom ledge

Figure 17:
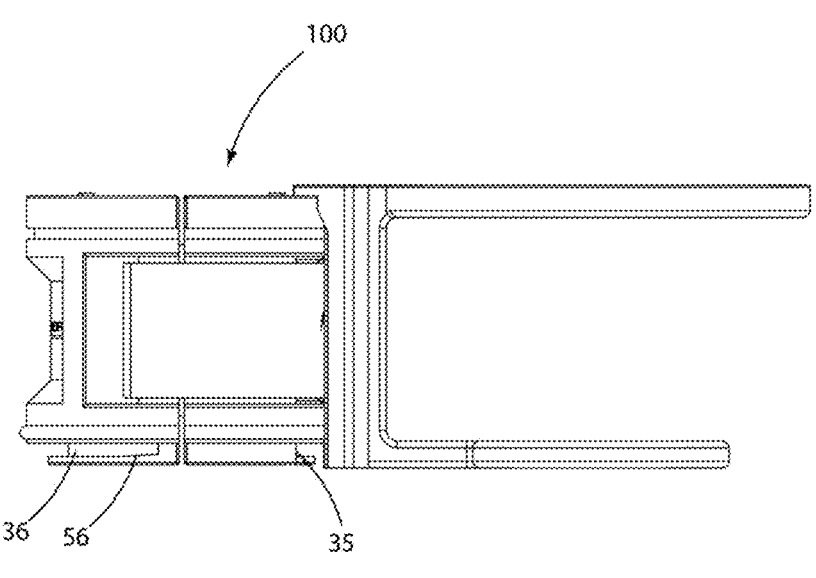
FIG. 17 is a side view of another embodiment of the utility clamping device holding at least one accessory in accordance to one, or more embodiments.

42 and the second bottom ledge can be angled 56 and increase in thickness, as shown in FIG. 17, allowing a bottom accessory 91 to tighten and lock within the first bottom channel 35 and second bottom channel 36 as it turns at least such as, for example, quarter turn, half turn, eighth of a turn, three-quarters of the turn or the like, as shown in FIGS. 18a and 18b. The first bottom ledge 42 and the second bottom ledge 44 can be integral to the first collar 12 and the second collar 14.

Figure 14:
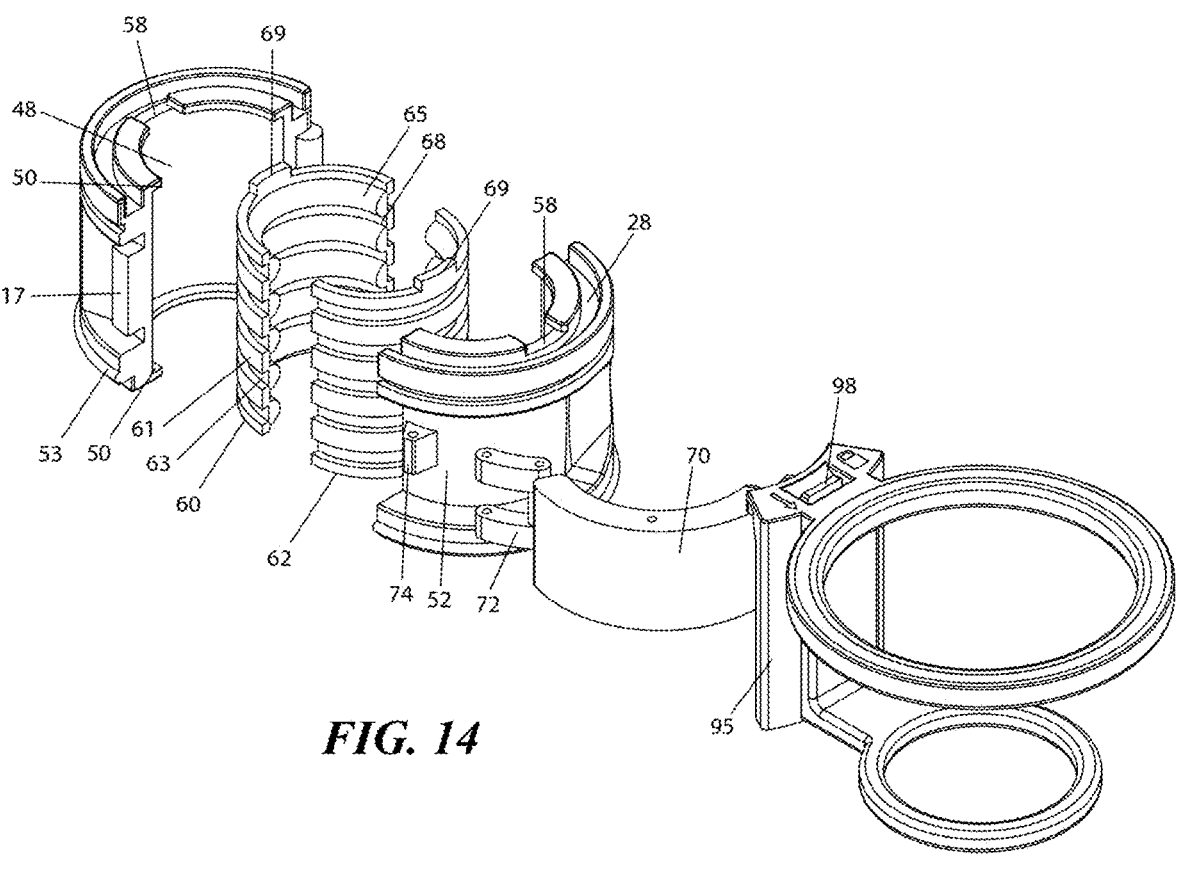
FIG. 14 is an isometric exploded view of another embodiment of the utility clamping device holding at least one accessory in accordance to one, or more embodiments.
Figures 16A, 16B:
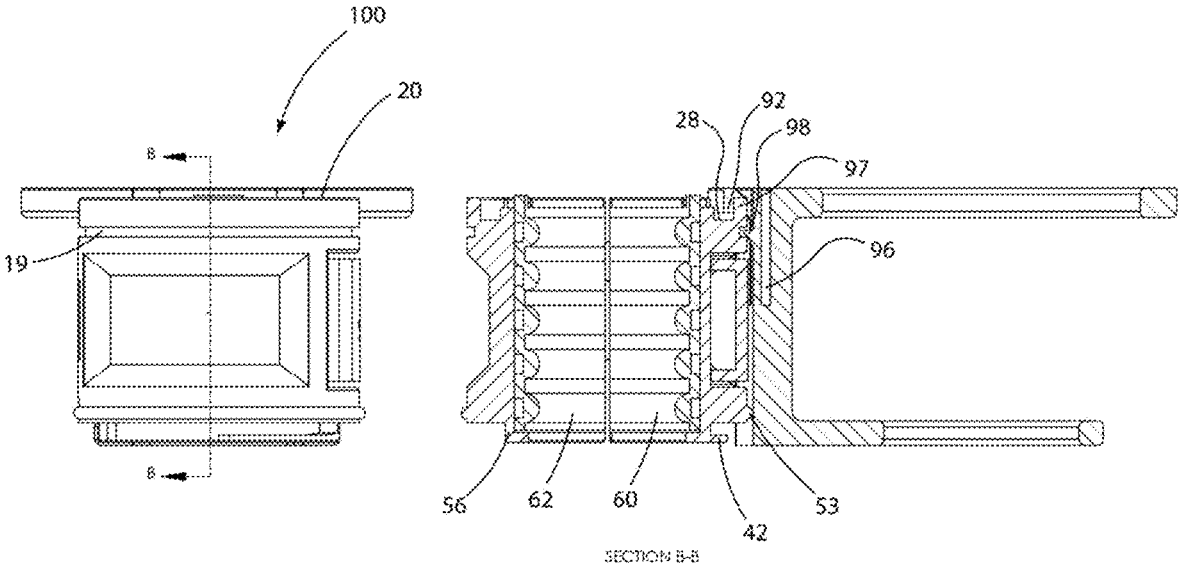
FIG. 16*a* is a side view of another embodiment of the utility clamping device holding at least one accessory in accordance to one, or more embodiments.
FIG. 16*b* is a cross-sectional view of FIG. 16*a* of another embodiment of the utility clamping device holding at least one accessory in accordance to one, or more embodiments.

The first collar 12 and the second collar 14 can have an inner channel 48 on the inner collar surface 15. The inner channel 48 can have at least one shim stop 50 that can extend from the top extension 45 and or both as shown in FIG. 14 and in another embodiment the shim stop can be omitted. In certain embodiments, the first collar 12 and the second collar 14 can further comprise a glide bar 53 that can be disposed on the first collar and the second collar extending longitudinally along a central axis substantially near the bottom surface 22, as shown in FIGS. 16a and 16b. The glide bar 53 can be such as for example, half circle, half triangle, half rectangle, or the like allowing the accessory 90 to rotate around the first collar 12 and the second collar 14 allowing for more than one accessory to be attached to the utility clamping device 100.

In embodiments, the utility clamping device 10 can further comprise a first shim 60 and a second shim 62 wherein the first shim and the second shim can be removably coupled to the first collar 12 and the second collar 14 by sliding into the collar inner surface and being retained by at least one shim stop 50 on at least one of the top or bottom as shown in FIG. 3b or 14. The first shim 60 and the second shim 62 can match the same shape as the inner channel 48 or can be such as, for example, C-shape configuration, circular shape, half circle configuration, or the like. The first shim 60 and the second shim 62 can have an inner shim surface 68 and an outer shim surface 61 wherein the shim outer surface can have at least one shim channel 63 and the inner shim surface can have at least one shim cushion 65, as shown in FIG. 14. The shim cushion 65 and the shim channel 63 when compressed around the shaft 80 can flatten itself out against the shaft creating a greater tactile grip between the shims and the shaft. The shim cushion 65 and the shim channel 63 can also allow for different diameter shafts 80 allowing the user to put the utility clamping device 10 on varying shaft shapes and diameters. The shim cushion 65 and the shim channel 63 can be spaced longitudinally down the first shim 60 and the second shim 62 having at least one shim cushion and at least one shim channel. The first shim 60 and the second shim 62 can be made from such as, for example, silicone, rubber, nitrile, neoprene, Teflon, Viton, thermoplastic polyurethane, plastic, metal, ceramic, or the like. The first shim 60 and the second shim 62 can have at least one shim tab 69 coupled to it wherein the shim tab can be integral to the first and second shim. The shim tab 69 can align with the shim notch 58 on the first collar 12 and the second collar 14 keeping the shim from moving axially within the collars.

Figure 7:
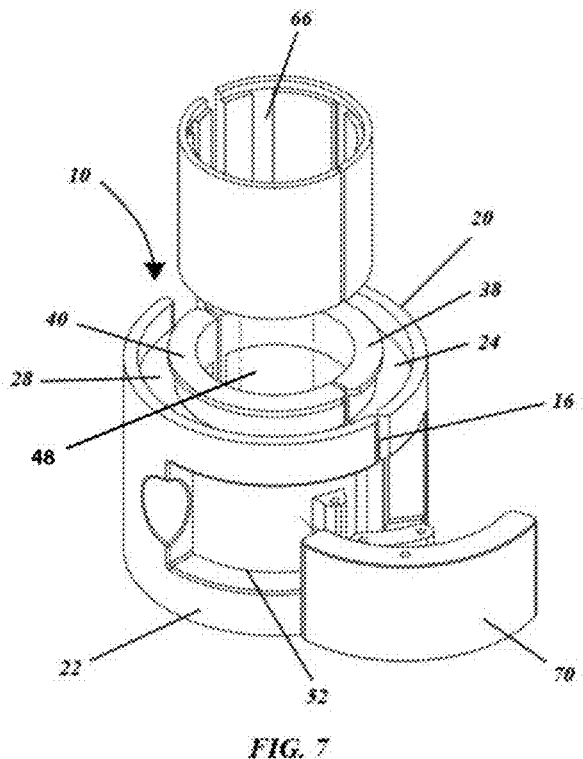
FIG. 7 is an isometric exploded view of the utility clamping device in accordance to one, or more embodiments.

In certain embodiments, the first shim 60 and the second shim 62 can have at least one shim slot 64 spaced axially around its inner channel 48, as shown in FIG. 7, wherein the shim slot can accommodate a gasket 66 wherein the gasket can be either permanently coupled or removably coupled to the shim slot. The gasket 66 can be made from such as, for example, silicone, rubber, nitrile, neoprene, Teflon, Viton, thermoplastic polyurethane, or the like.

Figure 12:
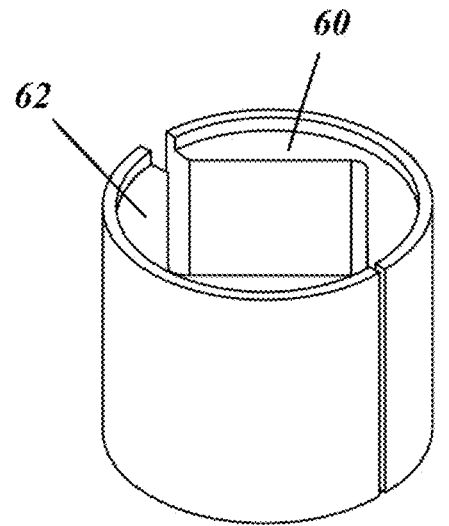
FIG. 12 is an isometric view of the first shim and second shim of the utility clamping device for holding at least one accessory in accordance to one, or more embodiments.

In embodiments, the first shim 60 and the second shim 62 can have different size inner shim surface 68 and shim cushion 65 to accommodate different size shafts 80, such as, for example, at least between 0.25 inches to 4 inches, and more preferably 1 inch to 2 inch and still more preferably 1.5 inch to fit different size shafts. In certain embodiments, the gaskets 66 can be substantially smaller in diameter to compress around the shaft 80 and to keep the utility clamping device 10 from slipping. The gasket 66 can be any suitable shape such as for example, square, rectangular, circular, oval, or any combination thereof. In other embodiments the first shim 60 and the second shim 62 inner surfaces can match the surface it will mate up and clamp around such as, for example, square bar on a golf cart or pole, oval bar, rectangular bar, polygonal bar, or the like, as shown in FIG. 12.

The first collar 12 and the second collar 14 can be removably coupled together on the first side 16 by a clasp 70 that is coupled to the first or second collar by a clasp connection 72, and the clasp collar connection 74. The clasp 70 can pivot on the first collar 12 and can latch onto the second collar 14 closing the two together and compressing the first shim 60 and the second shim 62 around the shaft 80. The clasp 70 can be such as, for example, draw latch, turn to open latch, keyed latch, magnetic latch, or the like. The clap 70 allows the first collar 12 and the second collar 14 to be tightened and secured around the shaft 80 and it allows the user to easily remove the utility clamping device 10 from the umbrella pole without have to remove the shaft from its hold allowing for easy removal and installation. The clasp 70 can be made from such as, for example, plastic, metal, aluminum, ceramic, composite, or the like. The first collar 12 and the second collar 14 can have a clasp channel 52 that can accept the clasp and allow the clasp to sit flush with the outer collar surface 17 of the first collar and the second collar. In another embodiment the clasp can pivot on the second collar 14 and latch onto the first collar 12 and the clasp channel can be omitted wherein the clasp 70 can sit on the outer collar surface 17 of the first collar and the second collar.

Referring to FIGS. 8-10 and 16a-16b, in embodiments, the at least one accessory 90 can be removably locked into the outer groove 19 by a locking tab 98 on the side of the accessory, as shown in FIG. 16b, or in other embodiments can be locked in first top groove 24 and/or first bottom groove 26 by a locking tab 98 on the top of the accessory, as shown in FIG. 9b. The accessory 90 can comprise a tongue 92 that can be placed into the one of the grooves and support the accessory vertically. The locking tab 98 can have a tab slot 96 which can allow the tab to move back and forth allow the user to move the table into a lock and unlocked position. The user can move the locking tab 98 into its unlocked position releasing the accessory from the utility clamping device 10. The accessory 90 can have a channel support 97 that sits against the first top channel 32 and the second top channel 34, as shown in FIG. 3b. The accessory 90 can further comprise a support 95 that is integrated into the accessory and supports the accessory against the utility clamping device 10. The channel support 97 and the support 95 can allow the accessory to freely rotate within the channels imitating a Lazy Susan wherein the user can rotate the accessory around to give easy access to that accessory. The channel support 97 and the support 95 can provide as little friction as possible to allow the accessory to spin freely.

A second accessory 91 can be a plate that locks into position through the locking slots 46 on the bottom of the utility clamping device 10, as shown in FIGS. 18a-18b. The second accessory 91 can have an accessory tab 99 that can be inserted into the locking slot 46 and then rotate in the first and second bottom channel retaining the second accessory on the utility clamping device 10. The accessory 90 and second accessory 91 can be such as, for example a tray, a speaker holder, a towel holder, a mobile device holder, a drink holder, a wine bottle holder, a tray, a beverage bag holder, a mini-cooler or the like each having the same or similar attaching components to removably attach the accessory to the utility clamping device 10 and 100.

A method of attaching a utility clamping device 10 or 100 to a shaft 80 wherein the first collar and the second collar have at least one shim placed in the inner surface and can be placed around the shaft and secured by the clasp 70. The user can attach the accessory 90 and 91 to the utility clamping device through the outer groove disposed on the outer collar surface and the first bottom ledge 42 and the second bottom ledge 44.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. A utility clamping device for holding at least one accessory on
   a shaft comprising:
   a first collar and a second collar detachably coupled together on a first side and rotatably coupled together on a second side wherein the first collar and the second collar have an inner collar surface and an outer collar surface and a top surface and a bottom surface;
   a first shim and a second shim having an inner shim surface and an outer shim surface wherein the outer shim surface is removably coupled to the inner collar surface and the inner shim surface is configured to be compression fit about the shaft wherein the first shim and the second shim is a C-shape configuration and wherein the outer shim surface has at least one shim channel and the inner shim surface has at least one shim cushion allowing for the shim cushion to compress against the shaft;

a slot disposed on the top surface, extending longitudinally along a central axis of the first collar and second collar which accommodates an attachment of the at least one accessory; and an outer groove disposed on the first collar and the second collar's outer collar surface allowing the at least one accessory to securely attach itself to at least one of the outer groove on the first collar and the outer groove on the second collar.

2. The utility clamping device according to claim 1, wherein the first collar and the second collar is a C-shape configuration.

3. The utility clamping device according to claim 1, wherein the first collar and the second collar are rotatably coupled together by a pin and a joint.

4. The utility clamping device according to claim 1, wherein the slot has a top extension extending towards the top surface wherein the top extension has a shim notch wherein the shim has a corresponding shim tab that allows for the first shim and the second shim to be aligned within the first collar and the second collar.

5. The utility clamping device according to claim 1, wherein the outer collar surface further comprises a glide bar which supports and allows the at least one accessory to easily rotate around the first collar and the second collar.

6. The utility clamping device according to claim 1, wherein the first bottom channel and second bottom channel extend to a first bottom ledge and a second bottom ledge wherein the first bottom ledge and the second bottom ledge are the same height as the bottom surface.

7. The utility clamping device according to claim 1, wherein the first collar and the second collar have at least one inner groove wherein the first shim and the second shim are removably coupled to the at least one inner groove.

8. The utility clamping device according to claim 7, wherein the first inner shim surface and second inner shim surface is circular or square.

9. The utility clamping device according to claim 7, wherein the first collar and the second collar are made from plastic, stainless steel, or aluminum.

10. The utility clamping device according to claim 7, wherein the first shim and the second shim are made from rubber, nitrile, neoprene, Teflon, Viton, or thermoplastic polyurethane.

11. The utility clamping device according to claim 1, wherein the first collar and the second collar are removably coupled by a clasp.

12. The utility clamping device according to claim 1, wherein the at least one accessory can comprise a tongue, a locking tab a support and a channel support.

13. The utility clamping device according to claim 12, wherein the at least one accessory is removably locked into the at least one of the outer groove on the first collar, the outer groove on the second collar, a first top groove, and a first bottom groove by a locking tab on the at least one accessory.

14. The utility clamping device according to claim 13, wherein the at least one accessory is removably locked into at least one of the first top groove, a second top groove, the first bottom groove, or a second bottom groove.

15. The utility clamping device according to claim 14, wherein the at least one accessory is removably attached and lock into position into the utility clamping device.

16. The utility clamping device according to claim 1, wherein the at least one accessory is a phone and tablet holder, drink holder, Bluetooth speaker holder, beverage bag holder, mini-cooler, tray, or towel holder.

* * * * *